United States Patent [19]

Wada et al.

[11] Patent Number: 4,672,178
[45] Date of Patent: Jun. 9, 1987

[54] REDUCED PRESSURE HEAT STORAGE ELEMENT AND ELECTRIC HEATER USING THE SAME

[75] Inventors: Takahiro Wada, Katano; Yoneno Hiroshi, Shiki, both of Japan

[73] Assignee: Matsushita Electric Industrial Co., Ltd., Osaka, Japan

[21] Appl. No.: 746,195

[22] Filed: Jun. 18, 1985

[30] Foreign Application Priority Data

Jun. 21, 1984 [JP] Japan .................. 59-127918

[51] Int. Cl.⁴ .................................................. F24J 3/00
[52] U.S. Cl. ..................................... 219/378; 219/530; 126/400
[58] Field of Search ............... 219/341, 378, 399, 462, 219/530, 540; 126/273.5, 400

[56] References Cited

U.S. PATENT DOCUMENTS

| | | | |
|---|---|---|---|
| 3,202,801 | 8/1965 | Saluri | 219/530 X |
| 3,450,196 | 6/1969 | Bauer | 219/378 X |
| 3,780,262 | 12/1973 | Rudd | 126/400 X |
| 4,268,558 | 5/1981 | Boardman | 126/400 X |
| 4,508,099 | 4/1985 | Clavier | 126/400 |
| 4,520,862 | 6/1985 | Helmbold | 219/378 X |
| 4,556,047 | 12/1985 | Clavier | 126/400 |

Primary Examiner—Howard N. Goldberg
Assistant Examiner—Taylor J. Ross
Attorney, Agent, or Firm—Wenderoth, Lind & Ponack

[57] ABSTRACT

The present invention relates to a heat storage element having a latent heat storage material sealed in the container under a reduced pressure. This heat storage element permits effective reduction of air in the heat storage element, and therefore, heat is smoothly transferred from outside to the latent heat storage material through the wall of the container. Accordingly, a heat storage element which has a very high heat storage characteristic is realized. Furthermore, this heat storage element, having almost no air sealed in, has a large heat storage density. When this heat storage element is used in combination with an electric heater element, heat will be uniformly transferred from the electric heater element to the latent heat storage material, involving a very small risk of part of the electric heater element being overheated.

14 Claims, 5 Drawing Figures

REDUCED PRESSURE HEAT STORAGE ELEMENT AND ELECTRIC HEATER USING THE SAME

BACKGROUND OF THE INVENTION

The present invention relates to a heat storage element for use in heating apparatuses, etc., and an electric heater using the same.

Heretofore, when using a latent heat storage material hermetically sealed in a flexible container, the mouth of the container was sealed under atmospheric pressure, after a solid or liquid latent heat storage material had been filled in the container.

When such a sealing method is utilized and if the latent heat storage material is in granular shape, more than 33% of the volume of the container is occupied by air which is sealed in together therewith. Moreover, as this element is heated, the air inside the container will expand and its proportion will further increase. If any air exists inside the heat storage element, the heat is transferred from outside to the heat storage material through this air layer; therefore, the heat transfer becomes harder than when the air layer does not exist, resulting a longer time being taken before the storing of heat has been accomplished. It is only natural that if the heat storage material and air are concurrently sealed in the heat storage element, the heat storage density per unit volume of the heat storage element will diminish. If the latent heat storage material in liquid state is sealed in a flexible container and the container is to be hermetically sealed, with the air content down, the liquid will come up to the fusing part (the mouth of the container) as the fusing layers are brought together, to be adhering thereon, thus detracting from proper sealing. Although the sealing for housing appears to be proper, the housings are easily opened by a small external pressure. Then it is inevitable concurrently to seal into the container a large amount of air in order to ensure the sealing; as a consequence, the heat storage characteristic is affected, with reduced heat storage density, as in the case of heat storage element having a granular latent heat storage material sealed in. Besides, when this heat storage element and an electric heater element are used in combination, because of the existence of air in the heat storage element, almost no heat is transferred to the heat storage material from the electric heater element part in the neighborhood of the air. Therefore, the temperature of the electric heater element at that part rises very high, sometimes with a risk of burning.

SUMMARY OF THE INVENTION

A first object of this invention is to provide a heat storage element which requires only a short time for storing heat.

A second object of this invention is to provide a heat storage element having a high heat storage density per unit volume.

A third object of this invention is to provide a heat storage element which permits easy hermetic sealing.

A fourth object of this invention is to provide an electric heater which permits heat transfer from the electric heater element to the heat storage element at a high efficiency.

A fifth object of this invention is to manufacture a safe electric heater in which the electric heater element does not arouse local abnormal heating.

These and other objects are accomplished by a heat storage element which comprises a latent heat storage material and a container housing this storage material; the heat storage material is hermetically sealed in the container under a reduced pressure.

In a specific embodiment, the air pressure under which the latent heat storage material is hermetically sealed in the container should fall within the range of from 1 mmHg to 200 mmHg. The container is formed of a metal-plastics laminate film having at least one metal layer and a fusing layer. The latent heat storage material is sealed in a gas-permeable flexible bag and this bag is hermetically sealed in this container at a reduced pressure. The gas-permeable bag is made of paper or cloth having a fusing layer. Further, the aforementioned latent heat storage material is formed of a mixture of sodium acetate trihydrate and sodium pyrophosphate. The container is formed of a laminate film. In another specific embodiment, the latent heat storage material is formed of mixture of sodium acetate trihydrate and lithium fluoride.

This invention also relates to an electric heater which comprises a latent heat storage material and a container housing this heat storage material, which is designed to have the heat storage material hermetically sealed in this container and which comprises an electric heater element arranged in close contact with the container having this storage material sealed therein.

In a specific embodiment, the electric heater element is a plane electric heater element. On the outside surface of the heat storage element, an electric heater element is bonded.

This invention has various advantages, among which are as follows:

(1) It provides a heat storage element which permits smooth transfer of heat from outside to the latent heat storage material through the wall of the container.

(2) It provides a heat storage element which gives a very high heat storage characteristic.

(3) It provides a heat storage element which has a large heat storage density.

(4) It provides an electric heater which can afford proper heat transfer from its electric heater element, when the heat storage element is used in combination with the electric heater element.

(5) It provides an electric heater in which part of the electric heater element may not be abnormally overheated because the heater element is in uniform contact with the latent heat storage material, thereby permitting uniform transfer of heat.

DETAILED DESCRIPTION OF THE INVENTION

The heat storage element and the electric heater using the same of this invention are described hereunder in connection with a few preferred embodiments and by reference to the accompanying drawings:

(EXAMPLE 1)

Figure 1:
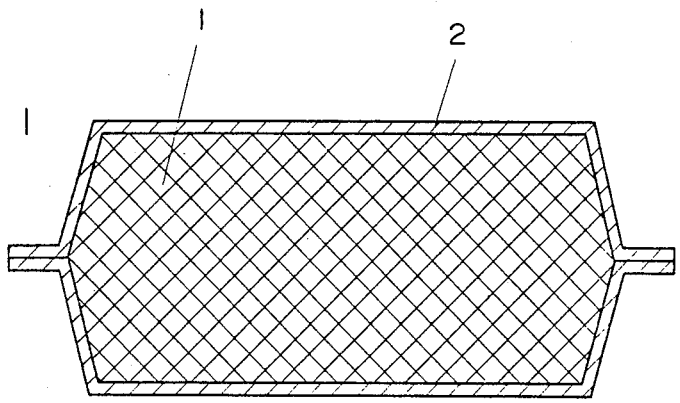
FIG. 1 is a front sectional view of a heat storage element of a first embodiment of this invention.

A heat storage element as shown in FIG. 1 was manufactured for trial. Employed as the latent heat storage material is a system of sodium acetate trihydrate with the addition of 2 percent by weight of sodium pyrophosphate as the anti-supercooling agent and used as the flexible container is a laminate film of a metal and plastics which involves no problem of causing evaporation of part of the component of the heat storage material (mainly water content) at the time of storing heat. According to a preferred embodiment of this invention, taking into account the strength, etc., of the container, a laminate film composed of 4 layers—from the outside, 12 μm polyester layer, 15 μm drawn nylon layer, 9 μm aluminum foil layer, and 80 μm polyethylene layer—was utilized. In the case of this laminate film, it was the innermost layer which was fused. Two such laminate films were put together and fused at necessary parts and therewith, a container having internal dimensions of 40 mm×60 mm was formed. In this container, 8 g of a granular latent heat storage material is hermetically sealed under various air pressures, as shown in Table 1 below:

TABLE 1

| Sample No. | Air pressure at the sealing time | Time required for accomplishing the storing of heat |
| --- | --- | --- |
| 1 | 0.1 mmHg | 16 min. |
| 2 | 1.0 | 16 min. |
| 3 | 10 | 16 min. |
| 4 | 50 | 16 min. |
| 5 | 100 | 16 min. |
| 6 | 300 | 20 min. |
| 7 | 500 | 23 min. |
| 8* | 760 | 35 min. |

*Sample 8 is presented as an example which is used for being compared with the embodiments of the invention.

Figure 2:
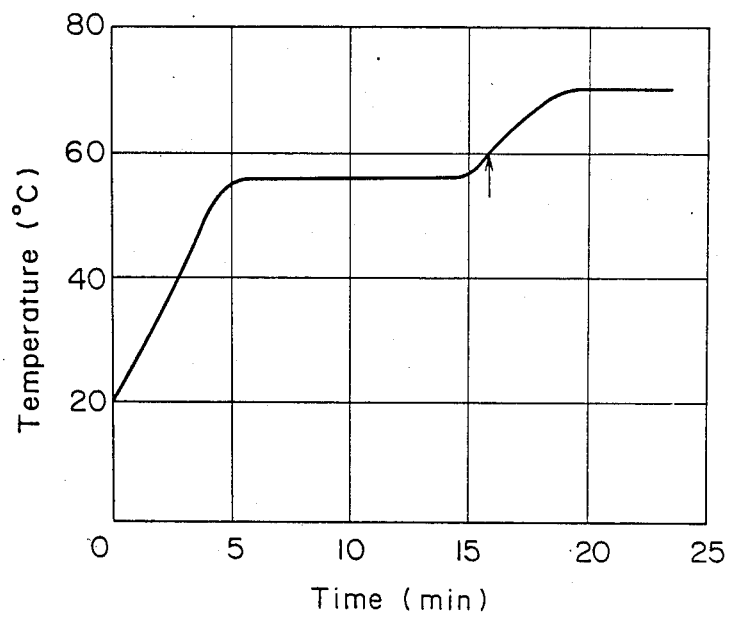
FIG. 2 is a graph showing the heat storage characteristic of this heat storage element.

With the heat storage element manufactured in this way placed horizontally and a heating plate containing a heater and subjected to temperature control at 70° C. placed thereon, the temperature at the bottom of the container is measured, using a thermocouple. The temperature change of Sample 2 is depicted in FIG. 2. In this graph, the ordinate represents the temperature at the bottom of the container, while the abscissa gives the passage of time after the heating plate was placed. And used as the measure of the time required for accomplishing the storing of heat was the passage of time taken before the temperature at the top of the container had risen over the transition temperature (58° C.) and reached 60° C. This time is indicated by an arrow mark in the drawing. The times required for accomplishing the storing of heat are listed in Table 1, together with the air pressures at the sealing time.

This table shows that when the air pressure at sealing time was lower than 100 mmHg, the time required for accomplishing the storing of heat was always 16 minutes. When it was 300 mmHg, the time required was 20 minutes, a little longer than the above. And under 760 mmHg, as long as 35 minutes is taken before accomplishing the storing of heat, which is longer about 120%, as compared with the time taken by the heat storage element which was hermetically sealed under a pressure lower than 100 mmHg.

For reduction of pressure, a vacuum pump is necessary and in order to elevate the degree of vacuum, long duration suction is necessary. To obtain a degree of vacuum of the order of 1 mmHg, an ordinary rotary pump is adequate, but to further elevate the degree of vacuum, a very long period of suction with a rotary pump or joint use of other vacuum pump is necessary. In that way, naturally the cost of the heat storage element is too high for it to be practically usable. As a final point, the desirable pressure range should fall within the range of between 1 mmHg and 200 mmHg.

It should be noted that lithium fluoride may be added as the anti-supercooling agent.

(EXAMPLE 2)

Figure 3:
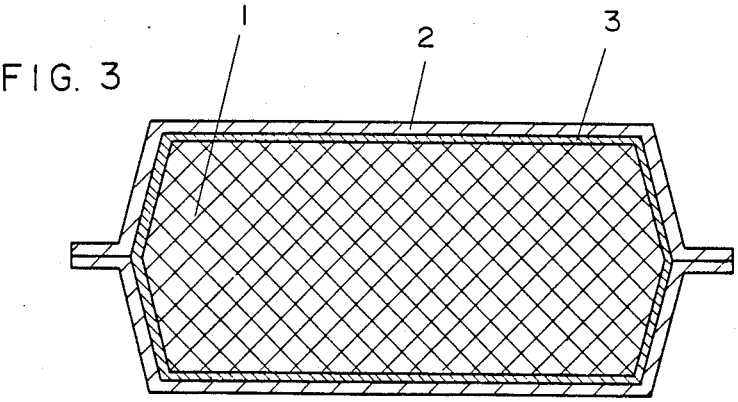
FIG. 3 is a front sectional view of a heat storage element of a second embodiment of this invention.

A heat storage element as shown in FIG. 3 was manufactured for trial. The latent heat storage material 1 and the flexible container 2 used were similar as those of Example 1. According to this embodiment, in order to prevent imperfect hermetic sealing resulting from adherence on the sealing mouth of the soaring-up powder of the heat storage material, the latent heat storage material was preliminarily sealed in a gas-permeable bag and was, thereafter, hermetically sealed in a flexible container under a reduced pressure. As the gas-permeable bag, one formed of paper or cloth having a fusing layer was considered to be suitable from the standpoint of mass-production. According to this embodiment, a bag made of a nonwoven cloth having a thermally fused layer of polyethylene on the inside was employed.

When the hermetic sealing was made under the similar air pressure condition as in Example 1, the heat storage element obtained gave a heat storage characteristic barely distinguishable from that in Example 1.

It should be appreciated that when a person having a body weight of approx. 60 kg had trampled the heat storage element of this example after heat has been stored therein, no leakage of heat storage material from the container was found at all.

(EXAMPLE 3)

Figure 4:
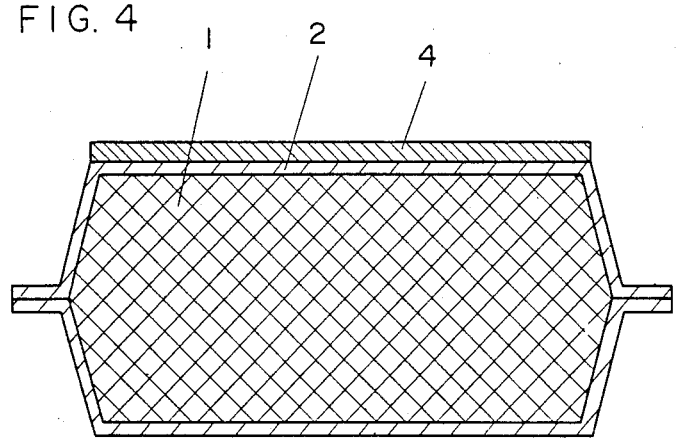
FIG. 4 is a front sectional view of a heat storage type electric heater embodying this invention.

A heat storage type electric heater (An electric heater using a heat storage element) as shown in FIG. 4 was manufactured for trial. The latent heat storage material 1 and the flexible housing container material used were similar to those in Example 1.

Figure 5:
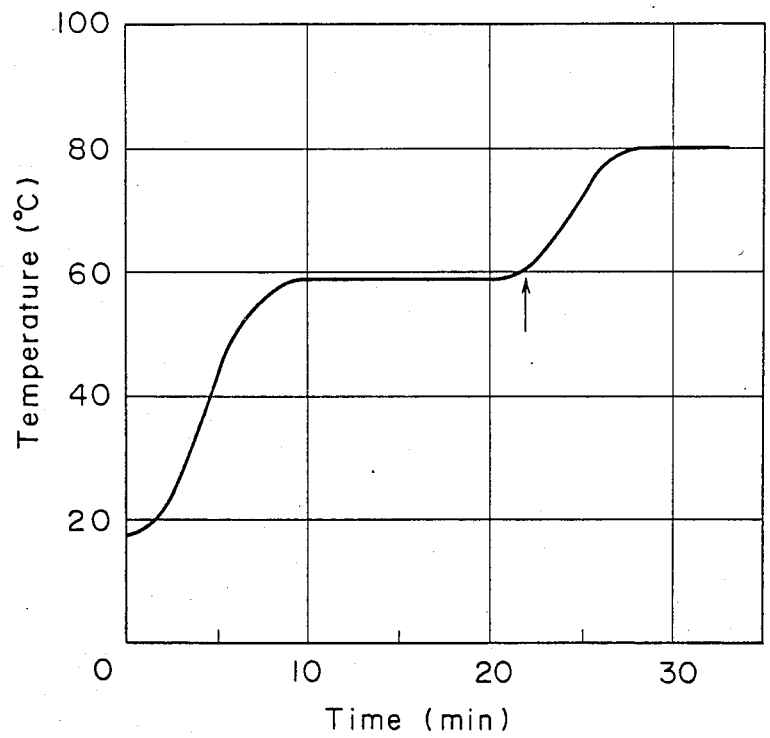
FIG. 5 is a graph showing the heat storage characteristic of this heat storage type electric heater.

Two laminate films were put together with necessary parts thermally fused and therewith a container of 100 mm×100 mm in internal dimensions was formed. In this container, 40 g of a granular latent heat storage material was filled and hermetically sealed under various air pressure as shown in Table 2 below. On one surface of the heat storage element manufactured in this way, a plane configured positive temperature coefficient electric heater element 4 (control temperature: approx. 80° C.) was pasted by use of an adhesive tape. This heat storage type electric heater was held between approx. 1 cm heat insulating material of expanded polyurethane and so installed as to bring the heater surface to the bottom. Evaluation of the heat storage characteristic was made by measuring with a thermocouple the temperature of the central part of the heat storage element on opposite side of the electric heater element. FIG. 5 exhibits the heat storage characteristic of Sample 2. In this graph, the ordinate gives the temperature at the center of the heat storage element on opposite side of the electric heater element, while the abscissa represents the time elapsed after the energization has begun. And used as the measure of the time required for accomplishing the storing of heat was the time elapsed before the temperature of the heat storage element has risen over the transition temperature of the heat storage material (58° C.) and reached 60° C., just as in the case of Example 1. This time is indicated by an arrow mark in the graph. The times required for accomplishing the storing of heat which were measured in this manner are indicated in Table 2 along with the air pressures at the sealing time.

This table shows that when the air pressure at the sealing time is lower than 100 mmHg, the time required before accomplishing the storing of heat is nearly constant and within 23 minutes, but under an air pressure of 300 mmHg, 29 minutes is required. And under 760 mmHg (atmospheric pressure), as long as 62 minutes are taken before the storing of heat has been accomplished. Thus approx. 170% more time is required, as compared with that when the sealing is done under a pressure of below 100 mmHg.

TABLE 2

| Sample No. | Air pressure at the sealing time | Time required for accomplishing the storing of heat |
|---|---|---|
| 1 | 0.1 mmHg | 22 min |
| 2 | 1.0 | 22 min |
| 3 | 10 | 22 min |
| 4 | 50 | 22 min |
| 5 | 100 | 23 min |
| 6 | 300 | 29 min |
| 7 | 500 | 40 min |
| 8* | 760 | 62 min |

*Sample 8 is presented as an example which is used for being compared with the embodiments of the invention.

(EXAMPLE 4)

Used as a latent heat storage material was a system of sodium acetate trihydrate with addition of 2 percent by weight of lithium fluoride as the anti-supercooling agent, and utilized as the container material, a laminate film formed of 4 layers—from outside, 12 μm polyester layer, 40 μm polyethylene layer, 9 μm aluminum foil layer and 150 μm polyethylene layer. Such a laminate film is folded in two and thermally fused at necessary parts. Forty grams of a latent heat storage material was sealed in a gas-permeable bag made of a similar material at that of Example 2 and this bag was hermetically sealed in a flexible container made of the laminate film under an air pressure of 10 mmHg. The electric heater element used was arranged in a plane with a linear pyrogen normally electrically insulated at its surface held between laminate films formed of 3 layers—from the outside, 12 μm polyester layer, 20 μm aluminum foil layer and 80 μm polyethylene layer. This electric heater element and the heat storage element were patched together, using an epoxy base adhesive, whereby the heat storage type electric heater of this embodiment was obtained.

On this heat storing electric heater, a bimetal type temperature control which was set to operate at 80° C. was mounted and its heat storing characteristic was measured. The time required for storing of heat was 25 minutes, which was an equivalent characteristic to that of Example 1. A product of the same construction but in which its heat storage material was sealed under atmospheric pressure took as long a time as 70 minutes before accomplishing the storing of heat.

While specific embodiments of the invention have been illustrated and described herein, it is realized that modifications and changes will occur to those skilled in the art. It is therefore to be understood that the appended claims are intended to cover all modifications and changes as fall within the true spirit and scope of the invention.

What we claim is:

1. A heat storage element comprising a latent heat storage material and a flexible container for housing this heat storage material, said heat storage material being hermetically sealed in the flexible container under a reduced pressure and said heat storage material closely contacting the inner surface of said container.

2. The heat storage element of claim 1, wherein air pressure under which said latent heat storage material is hermetically sealed in the container falls within the range between 1 mmHg and 200 mmHg.

3. The heat storage element of claim 1, wherein said container is formed of a metal-plastic plastic laminate film having at least one layer of metal and a fusing layer.

4. The heat storage element of claim 1, wherein said latent heat storage material is a mixture of sodium acetate trihydrate and sodium pyrophosphate.

5. The heat storage element of claim 1, wherein said latent heat storage material is a mixture of sodium acetate trihydrate and lithium fluoride.

6. The heat storage element of claim 1, wherein said latent heat sotrage material is sealed in a flexible gas-permeable bag, said bag being hermetically sealed in the container under a reduced pressure.

7. The heat storage element of claim 6, wherein said gas-permeable bag is formed of paper or cloth having a fusing layer.

8. An electric heater comprising a latent heat storage material a flexible container for housing this heat storage material and said heat storage material closely contacting the inner surface of said container, and an electric heater element arranged in close contact with said container having this heat storage material hermetically sealed therein, said electric heater being designed to have said heat storage material hermetically sealed in the container under a reduced pressure.

9. The electric heater of claim 8, wherein said electric heater element is a plane configured positive temperature coefficient electric heater element.

10. The electric heater of claim 8, wherein said electric heater element is bonded on the outside surface of the heat storage element.

11. The heat storage element of claim 8, wherein said latent heat storage material is a mixture of sodium acetate trihydrate and sodium pyrophosphate.

12. The heat storage element of claim 8, wherein said latent heat storage material is a mixture of sodium acetate trihydrate and lithium fluoride.

13. A heat storage element comprising a latent heat storage material which is either one of a mixture of sodium acetate trihydrate and sodium pyrophosphate, and a mixture of sodium acetate trihydrate and lithium fluoride, and a container formed of a laminate film for housing said storage material, said heat storage material being hermetically sealed in the container under a reduced pressure.

14. The heat storage element of claim 13 further comprising an electric heater element arranged in close contact with the container having the heat storage material hermetically sealed therein.

* * * * *